J. HOEFER.
Beer Cooler.
No. 47,823.
Patented May 23, 1865.
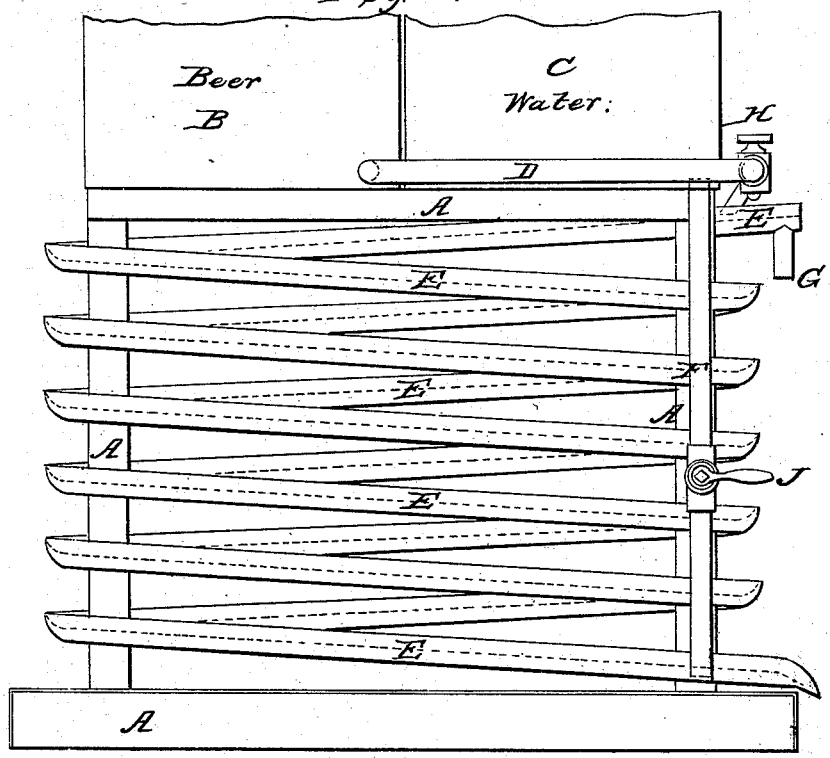
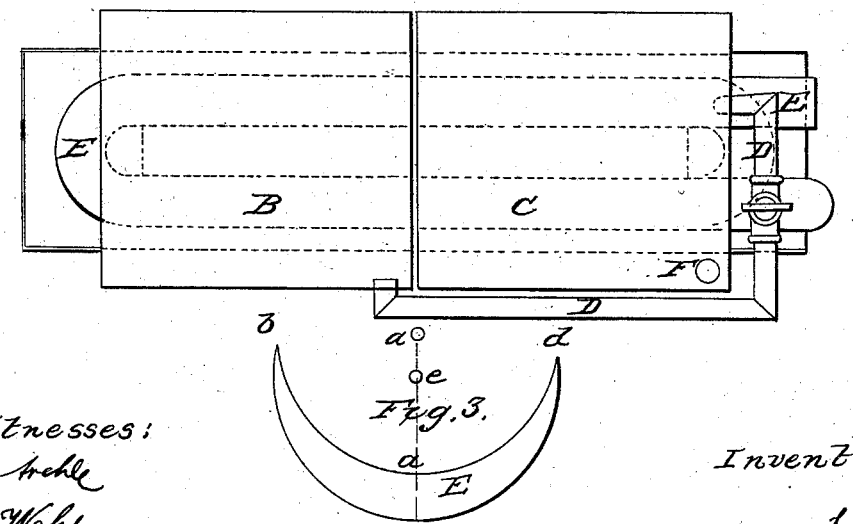
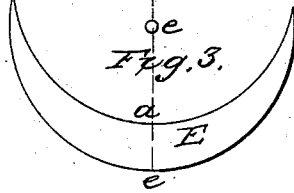

UNITED STATES PATENT OFFICE.

JULIUS HOEFER, OF NEW YORK, N. Y.

IMPROVED APPARATUS FOR COOLING BEER.

Specification forming part of Letters Patent No. 47,823, dated May 23, 1865.

*To all whom it may concern:*

Be it known that I, JULIUS HOEFER, of the city, county, and State of New York, have invented a new and Improved Method of Cooling Beer or Other Liquids; and I do hereby declare the following to be a full, clear, and exact description thereof, reference being had to the annexed drawings, making part of this specification, in which—

Figure 1 is a front view of the apparatus employed by me for that purpose. Fig. 2 is a top view of the same. Fig. 3 is a cross-section of the pipe and gutter in which the water and the beer is conveyed, as hereinafter described.

The same letters mark the same parts in all the figures.

The nature of my invention consists in cooling beer or other liquids which require cooling by conveying the cooling-water through pipes formed in such a manner that the upper portion constitutes an open hollow or gutter, and by conveying the beer to be cooled in the said hollow or gutter simultaneously with the water.

To enable others skilled in the art to make and use my invention, I will proceed to describe its construction and operation.

In the annexed drawings, A A A A represent the frame of the apparatus, on the top of which are two tanks, B and C, the former of which is intended for the reception of beer and the latter for water.

D is a pipe of the usual construction, leading from the beer-tank to the open hollow of the pipe E, (the peculiar construction of which will be hereinafter more fully described,) which said pipe is conducted from the upper end of the frame to the lower one in windings similar to those of a screw.

F is another pipe of the usual construction, leading from the bottom of the water-tank to the bottom of the inner part of the pipe E.

One manner of constructing the pipe E is represented in Fig. 3. The hollow or gutter is formed by a segment of a circle, *b a d*, described with a radius, *a a*. The lower end of the pipe is formed by a segment of a circle, *b e d*, described with the radius *e e*, which is equal to the radius *a a*, and forms a continuation of the same. In this manner the form of a quarter-moon is produced, the open hollow of which is intended to contain the beer or other liquid to be cooled, and the space between the two circles is intended to contain the water. Both parts of the pipe are made of thin metal.

G is a pipe of usual form to carry off the waste water.

The invention is not confined to the exact shape of the pipe E as represented in the drawings, as any other shape by which an open hollow and an inclosed hollow is formed will answer the purposes of the invention.

H represents a cock by which the flow of the beer may be regulated, and J represents a cock for the purpose of regulating the flow of the water.

The apparatus is used in the following manner: The tank B is filled with hot beer or other liquid to be cooled and the tank C with water. The cocks H and J are then opened, when the beer will flow in the open hollow of the pipe E from the top of said hollow down to the bottom thereof into casks or tanks, (not shown in the drawings,) and the cold water, which enters near the bottom of the pipe E and into the interior of the said pipe, will flow upward in said pipe, and after having traversed through the whole pipe E will be carried off through the waste-pipe G. During this continuous flow of the hot beer downward and the cold water upward the former will lose the greater part of its heat by its contact with the pipe E (rendered cold through the water within) and with the atmosphere.

The advantage of this method of cooling beer and other liquids consists in greater economy and in saving of time.

Having thus fully described my invention, what I claim as new, and desire to secure by Letters Patent of the United States, is—

Cooling beer or other liquids by causing the same to flow downward in the open hollow of the metal pipe E and by causing the cold water to rise upward in the inclosed space of the pipe E, substantially in the manner and for the purpose described.

J. HOEFER.

Witnesses:
CHS. WEHLE,
H. WEHLE.